(12) United States Patent
Hieronimi

(10) Patent No.: US 11,995,203 B2
(45) Date of Patent: May 28, 2024

(54) COMPUTER-IMPLEMENTED METHODS FOR HANDLING REQUESTS BY USING A DISTRIBUTED LEDGER DATABASE

(71) Applicant: Oncare GmbH, LLC, Munich (DE)

(72) Inventor: Christian Hieronimi, Grünwald (DE)

(73) Assignee: Oncare GmbH, LLC, Munich (DE)

( * ) Notice: Subject to any disclaimer, the term of this patent is extended or adjusted under 35 U.S.C. 154(b) by 322 days.

(21) Appl. No.: 17/628,850

(22) PCT Filed: May 6, 2020

(86) PCT No.: PCT/EP2020/062533
§ 371 (c)(1),
(2) Date: Jan. 20, 2022

(87) PCT Pub. No.: WO2021/013393
PCT Pub. Date: Jan. 28, 2021

(65) Prior Publication Data
US 2022/0261491 A1 Aug. 18, 2022

(30) Foreign Application Priority Data
Jul. 24, 2019 (EP) .................................... 19188165

(51) Int. Cl.
*G06F 21/62* (2013.01)
*G06F 21/60* (2013.01)
(Continued)

(52) U.S. Cl.
CPC ........ *G06F 21/6218* (2013.01); *G06F 21/602* (2013.01); *G06Q 20/3821* (2013.01); *H04L 9/50* (2022.05); *H04L 2209/56* (2013.01)

(58) Field of Classification Search
CPC ............. G06F 21/6218; G06F 21/602; G06Q 20/3821; H04L 9/50; H04L 2209/56
See application file for complete search history.

(56) References Cited

U.S. PATENT DOCUMENTS 11,803,849 B1 * 10/2023 Lawrence ............... G06Q 40/02
2018/0183768 A1 * 6/2018 Lobban ................. H04L 63/061
(Continued)

FOREIGN PATENT DOCUMENTS

| JP | 201750763 A | 3/2017 |
| WO | 2017006135 A1 | 1/2017 |
| WO | 2020006222 A1 | 1/2020 |

OTHER PUBLICATIONS

Said A, Janjua MU, Hassan S-U, Muzammal Z, Saleem T, Thaipisutikul T, Tuarob S, Nawaz R. 2021. Detailed analysis of Ethereum network on transaction behavior, community structure and link prediction. PeerJ Comput. Sci. 7:e815 http://doi.org/10.7717/peerj-cs.815 (Year: 2021).*

(Continued)

*Primary Examiner* — Chau Le
(74) *Attorney, Agent, or Firm* — Kilpatrick Townsend & Stockton LLP

(57) ABSTRACT

Computer methods and devices for handling requests by using a distributed ledger database. An evaluation of a request is performed based on a first data item comprising first information about a state of a system and on a second data item comprising second information about a proposed action in response to the state of the system.
The first and second data items are evaluated to establish whether, given the state of the system, the proposed action is appropriate. A third data item is provided and a fourth data item is accessed. The third data item comprises encrypted first information. The fourth data item comprises information for accessing encrypted information comprised in a first encrypted data item. The first data item is authenticated against the first encrypted data item to establish whether the information in the first data item is compatible with the in-formation in the first encrypted data item.

16 Claims, 4 Drawing Sheets

(51) Int. Cl.
*G06Q 20/38* (2012.01)
*H04L 9/00* (2022.01)

(56) References Cited

U.S. PATENT DOCUMENTS

| 2019/0123895 | A1* | 4/2019 | Blake | H04L 9/0637 |
| 2023/0198771 | A1* | 6/2023 | Ho | H04L 9/0866 |
| | | | | 713/168 |
| 2023/0230066 | A1* | 7/2023 | Jakobsson | G06Q 20/3829 |
| | | | | 705/67 |
| 2023/0318856 | A1* | 10/2023 | Seki | G06Q 20/3678 |
| | | | | 713/189 |
| 2023/0342437 | A1* | 10/2023 | Pagani | G06F 21/57 |

OTHER PUBLICATIONS

Robinson, Peter, "Requirements for Ethereum Private Sidechains", arxiv.org, Cornell University Library, 201 Olin Library Cornell University Ithaca, NY, 14853, Jun. 26, 2018, XP081242449, p. 1-p. 7, p. 13, right-hand column, p. 16, right-hand column p. 20, right-hand column p. 30; table 1.
PCT/EP2020/062533; International Search Report and Written Opinion; dated Aug. 17, 2020; 16 pages.
EP Application No. 19188165.5; European Search Report; dated Mar. 2, 2020; 12 pages.
EP Application No. 19188165.5; European Office Action; dated Apr. 23, 2021; 4 pages.
EP20179343.7, "Office Action", dated Feb. 15, 2023, 7 pages.
EP Application No. 19188165.5, Office Action, dated Feb. 7, 2022, 4 pages.
JP Application No. 2022-504547; Office Action; dated Apr. 12, 2023; 3 pages.
IN Application No. 202247005893, Office Action, dated May 31, 2022, 121 pages.

* cited by examiner

COMPUTER-IMPLEMENTED METHODS FOR HANDLING REQUESTS BY USING A DISTRIBUTED LEDGER DATABASE

The present invention refers to computer methods for handling requests by using a distributed ledger database and, in particular, blockchains. Moreover, the present invention refers to data processing systems and computer program products performing said methods.

In particular, the present invention refers to a computer implemented method for performing an evaluation of a request, said evaluation being performed by an evaluation node of the computer network managing the distributed ledger database. The present invention refers also to a computer implemented method for submitting a request to the evaluation node. Requests handled by the methods of the present invention are in particular submitted by a requester by using a requesting device and may ask the evaluation node to establish whether a proposed action is appropriate to be taken in response to a state of a system.

For example, the system and the state thereof may be a patient and a diagnosis made by a physician, respectively. The proposed action may thus be the action of funding the patient to purchase a drug and/or a medical treatment prescribed by a physician. The evaluation node may be a computer device of an insurance company and the requesting device may be a computing device of the patient. In this case, the patient submits a request asking the insurance company to cover the costs of the aforementioned drug and/or medical treatment and the insurance company may, by means of the evaluation node, establish whether the requester is, given the diagnosis and his/her policy, entitled to be funded.

For instance, the system may be machine tool, e.g. a milling or a grinding machine. The state of the system may be the internal status of the machine tool which, for instance, may comprise a malfunctioning component. If this is the case, the proposed action may be an action aiming to overcome the malfunctioning of said component. The requesting device may be a computing device integrated in the machine tool and the evaluation node may be a computing device of the maintenance department of a factory. In this case, for example, the computing device submits a request asking the evaluation node to establish whether, given the internal status of the system, the action aiming to overcome the malfunctioning is appropriate.

Moreover, the system may be a first computing device and the state of the system may be the internal status of the first computing device. The proposed action may be an action aiming to quarantine or erase a potentially infected file stored in the first computing device. In this case, the requesting device may be the first computing device itself and the evaluation node may be a computing device owned by a software security company.

Computer implemented methods for handling and evaluating requests by means of an evaluation device are known in the art. In order to safeguard the interests of both the requester and the evaluator, the latter has to be able to access all the information needed to perform an informed evaluation of the request. Moreover, said information as well as the result of the evaluation should be trustworthy, e.g. their truthfulness should be verifiable.

According to the known methods, the information about the state of the system, the proposed action, and/or the evaluation of the request are made trustworthy by making them accessible by a relatively large pool of individuals, devices and/or organisations, that are able prove their truthfulness. These informations, however, may have a certain degree of confidentiality and, rather than being disseminated to a wide audience, should be kept confidential among a relatively small circle of authorized individuals, devices, and/or institutions.

A technical problem affecting the computer implemented methods known in the art is thus the problem of making the information about the state of the system, about the proposed action, and/or about the evaluation of the request trustworthy whilst limiting and/or controlling the dissemination of said information.

This problem is at least partially solved by the invention of the present application, which relates to computer-implemented methods according to claims 1 and 10, to a data processing system according to claim 15, and to a computer program product according to claim 16. Embodiments of the invention are subject matter of the dependent claims.

A first aspect of the present invention refers to a computer implemented method for performing an evaluation of a request submitted by a requesting device. The evaluation of the request is performed by an evaluation node of a computer network and is based on a first data item comprising first information about a state of a system and on a second data item comprising second information about a proposed action in response to the state of the system.

A first encrypted data item is stored in a distributed ledger database managed by the computer network. In particular, a copy of the distributed ledger database is stored in the evaluation node. The method comprises at least the steps of:

Accessing the first data item, the second data item and the request;

Evaluating the request at least by using the first and the second data item to establish whether, given the state of the system, the proposed action is appropriate;

Initiating the providing of a third data item;

Accessing a fourth data item; and

Authenticating the first data item against the first encrypted data item to establish whether the information in the first data item is compatible with the information in the first encrypted data item.

The third data item comprises encrypted first information, encrypted second information, and information about the evaluation of the request performed by the evaluation node. The fourth data item comprises information for accessing encrypted information comprised in the first encrypted data item. In particular, the fourth data item may comprise information identifying the evaluation node and said information may be encrypted. For example, the fourth data item is identical to the third data item and, in particular, may be a copy thereof.

According to the present invention, the computer network may be a set of nodes which may exchange data with one another by using connections, e.g. data links. Said data links are established over at least a wired and/or a wireless medium. According to the present invention, a wired medium may be a coaxial cable, an optical fiber cables or the like, and a wireless medium may be a Wi-Fi or the like. A node of the computer network, e.g. the evaluation node, and/or the requesting device may be a computing device or a cluster thereof.

According to the present invention, a computing device may in particular comprise a processing element (CPU, GPU, or the like) and storage means. The storage means may comprise at least a volatile primary memory (e.g. a RAM, a DRAM, a SRAM, a CPU cache memory, or the like), a non-volatile primary memory (e.g. a ROM, a PROM, an EPROM or the like), and/or a secondary memory. In particular, the volatile primary memory temporarily holds program files for execution by the processing element and related data and the non-volatile primary memory may contain bootstrap code for the operating system of the computing device. According to the present invention, a computing device may be a computer system including input and/or output devices and, more particularly, may be a smartphone, a computer, a tablet, or the like. The evaluation node may be a computing device of an evaluation organization in charge of evaluating the request.

According to the present invention, the distributed ledger database (hereinafter also referred to as: "DLD") may be a database spread across a plurality of nodes. In particular, data contained in the DLD are replicated, shared, synchronized across a plurality of nodes of the computer network. Each of said nodes stores a copy of the DLD and updates said copy only if the nodes of the computer networks agree by consensus on the update, thereby guaranteeing that copies stored by different nodes are identical to one another. In particular, the DLD allows for storing data in a verifiable, immutable way.

A data item according to the present invention is in particular a set of symbols comprising information. A data item according to the present invention may be stored in a file, organized in a database, and/or stored in storage means or in a cloud. Two or more of the data items may be stored together in the same file. For example, a data item of the present invention may be divided into data portions and stored in such a way that different data portions are stored in different files and/or different storage means.

The first and/or the second data item may be stored in storage means accessible by and/or comprised in the requesting device. Said items may be protected, e.g. password-protected, to prevent unauthorized accesses by unauthorized computing devices, e.g. by some of the nodes of the computer network.

In particular, the encrypted first information is an encryption of the first information according to a first encryption procedure and/or the encrypted second information is an encryption of the second information according to a second encryption procedure. The encrypted first information and/or the encrypted second information are, in particular, a set of symbols obtained by encrypting the first and the second information, respectively.

In particular, the first encrypted data item comprises encrypted information about the current state of the system and it is stored in the DLD which is accessible by the nodes of the computer network. In particular, the encrypted information comprised in the first encrypted data item is stored in a verifiable and immutable way and is not intelligibly accessible by the nodes, that are not authorized by the requester and/or the requesting device.

According to the present invention, data items, digital signatures, and/or information may be encrypted and/or decrypted according to encryption procedures such as the first and the second encryption procedure. Said procedures may comprise at least a symmetric key algorithm and/or at least a public-key encryption algorithm. The symmetric key algorithm is for example the Twofish, the Serpent, the Advanced Encryption Standard, the Blowfish, the CASTS, the Kuznyechik, the RC4, the DES, the 3DES, the Skipjack, the IDEA algorithm, or the like. The Public-key encryption algorithm may be the Diffie-Hellman key exchange protocol, the ElGamal encryption algorithm, the Paillier cryptosystem, the RSA encryption algorithm, the Cramer-Shoup cryptosystem, the YAK authenticated key agreement protocol, or the like. The public-key encryption algorithm may for instance be an algorithm based on an elliptic curve technique or on a password-authenticated key agreement technique. The encryption procedures of the present invention (e.g. the first and/or the second encryption procedure) may comprise a hash algorithm which uses at least a cryptographic hash function to encrypt data items and/or information (e.g. the first and/or the second information).

The request may consist of information prompting the evaluation node to perform the step of evaluating the request and may be comprised in at least a data item, e.g. in the first and/or the second data item. The request may be included in a file which may also include the first and/or the second data item.

For instance, the requesting device may initiate the providing of the first and the second data item. In particular, according to the present invention, the requesting device may initiate the providing of a data item to the evaluation by providing said data items to the evaluation node or by instructing another computer device to carry out the providing.

According to the present invention, data items are provided to a computing device (e.g. to the evaluation node or the requesting device) by sending them to said device e.g. via a secure connection. A data item may also be provided to a computing device by allowing the device to access the information encoded by the data item. For example, said access may be granted by sending to the computing device a link to the data item. For instance, if the data item is password-protected, the access to the information of the data item may be granted by supplying to the computing device a username/password access to said data item. The requester and/or the requesting device may authorize the evaluation node to access the first and/or the second data item. Said authorization may be implicitly granted e.g. by sending said data items to the evaluation node and/or by giving the evaluation node access to said data items.

In particular, the evaluation device accesses the information comprised the first and the second data item to acquire the information about the state of the system and about the proposed action and uses said information to evaluate the request. The step of evaluating the request aims to establish whether the request is acceptable or not. For example, the request is considered acceptable if the evaluation node establishes that, given the state of the system, the proposed action is appropriate, and unacceptable otherwise.

The evaluation procedure may comprise the step of applying at least an algorithm, a mathematical model, and/or a machine learning model to establish whether, given the state of the system, the proposed action is appropriate. The machine learning model may be obtained by training a machine learning algorithm such as a decision tree, a support vector machine, a neural network, or the like. In particular, the neural network may be a feed-forward neural network, a convolutional neural network, a recurrent neural network or the like. For example, the machine learning model may be a trained neural network, e.g. a feed-forward network, which accepts information about the state of the system and about the proposed action as input and classifies the proposed action as "appropriate" or "inappropriate". For instance, the machine learning model may be a trained neural network, which accepts the state of the system as input and predicts the most suitable action. For example, in this case, the proposed action is deemed to be appropriate if it coincides with the most suitable action.

After the step of evaluating the request, the evaluation node may generate the third data item and may initiate the providing of said item e.g. to the requesting device. According to the present invention, the evaluation node may initiate the providing of a data item to the requesting device by providing said data items or by instructing another computer device to carry out the providing. The third data item comprises information about the result of the request and the information which has been relevant in the evaluation of the request.

According to the present invention, the requesting device may access (e.g. receive) the third data item and, if the evaluation node considers the request to be acceptable, may provide the information comprised in the third data item to the nodes of the computer network for uploading the DLD. In particular, as described in the following, the nodes validate said information and, if the validation is successful, update the DLD by adding the information comprised in the third data item. In particular, if the evaluation node considers the request to be acceptable, the requesting device may generate the fourth data item and initiate the providing of said data item to the evaluation node for authentication.

In particular, the information for accessing the encrypted information in the first encrypted data item may comprise information for accessing the first encrypted data item in the DLD. The information for accessing the encrypted information in the first encrypted data item may comprise information for locating and/or accessing said encrypted information in a first database, which stores the encrypted information of the first encrypted data item. For example, the first database may acquire said encrypted information by accessing, copying, and/or receiving the first encrypted data item stored in the DLD, e.g. in the local copy thereof, and by storing the encrypted information comprised in said data item. The first database may in particular be stored in the storage means comprised in and/or accessible by the evaluation node.

The evaluation node may access the first and the second data item and thus may acquire unencrypted information about both the state of the system and the proposed action, thereby being able to perform a well-informed evaluation of the request.

The first data item is not stored in a transparent way, e.g. it may be stored in the storage means of the requesting device. Therefore, said data item cannot, a priori, be assumed to reflect the actual state of the system, since, e.g. the information comprised therein could be outdated or could have been forged or tampered. According to the present invention, the truthfulness of the information comprised in the first data item may be ascertained by authenticating said data item against the first encrypted data item, which is stored in an immutable, verifiable way in the DLD.

In particular, the step of authenticating the first data item against the first encrypted data item allows the evaluation node to assess whether the current state of the system stored in the first encrypted data item corresponds to state of the system described in the first data item. For example, in order for the authentication of the first data item to be considered successful, these two states shall correspond to one another. In particular, if these two states do not correspond, the authentication is unsuccessful.

The step of authenticating the first data item is in particular performed according to a first authentication procedure, which may comprise the steps of accessing the DLD and/or the first database to acquire the encrypted information comprised in the first encrypted data item, and the step of using said encrypted information to establish whether the information in the first data item is compatible with the encrypted information comprised in the first encrypted data item.

According to the method of the present invention, the information about the state of the system is trustworthy and may be controllably disseminated. In particular, information about the current state of the system is stored in encrypted form in the DLD and is accessible to the nodes of the computer network. Information about the state of the system is also provided in unencrypted form to the evaluation node which intelligibly accesses the unencrypted information and thus performs an informed evaluation of the request. The first encrypted data item is stored in an immutable, verifiable way in the DLD and, hence, the step of authenticating the first information against the first encrypted data item allows the evaluation node and/or any other computer device authorized by the requesting device to establish the truthfulness of the information about the state of the system. Moreover, the step of authenticating the first data item allows for coping with potential modifications of the state of the system taking place in the time interval between the evaluation of the request and the updating of the DLD.

Another embodiment of the method according to the first aspect of the present invention further comprises the steps of:

Accessing a fifth data item; and
Updating the DLD by adding a sixth data item to the DLD.

The fifth data item comprises information about the evaluation of the request, the encrypted first information, and the encrypted second information. The sixth data item comprises information about the evaluation of the request performed by the evaluation node, the encrypted first information, and the encrypted second information. Since the nodes of the computer network may access the data stored in the DLD, the information comprised in the sixth data item may be encrypted. The sixth data item may further comprise information for accessing the encrypted information comprised in the first encrypted data item. The requesting device may initiate the providing of the fifth item to the evaluating node. In particular, the evaluation node may update the copy of the DLD stored in the evaluation node, hereinafter also referred as: "the local copy".

The information about the evaluation of the request may be encrypted and/or may comprise information identifying the evaluation node. The information about the evaluation of the request may specify whether the evaluation node has considered the request to be acceptable or unacceptable. For example, the request is considered acceptable if the evaluation node establishes that, given the state of the system, the proposed action is appropriate, and unacceptable otherwise.

In particular, the DLD may be considered to be a register storing information about the events that lead to the current state of the system. For example, the sixth data item is a record of the evaluation of the request, said evaluation being e.g. an event initiated by the requesting device and carried out at least by the evaluating node.

In this embodiment, the information about the request is stored in an immutable, verifiable way in the DLD. Said information comprises the information about the request as well as encrypted first and second information and is trustworthy, since e.g. it may be checked by a central authority authorized by the requester to access the first and the second data item. For instance, said authority may re-evaluate the request by using the first and the second data item and authenticate the result of the re-evaluation against the encrypted information stored in the DLD to establish whether the evaluation performed by the evaluation node agrees with the one performed by the authority. Moreover, the information about the state of the system and about the proposed action, which are potentially sensitive, are encrypted and thus may be controllably disseminated prior authorization of the requesting device and/or of the evaluation organization.

In particular, the sixth data item comprises first validity information about the result of the step of authenticating the first data item. The first validity information may be encrypted. For example, if the authentication successful, the first validity information specifies that the request is valid and, if the authentication is unsuccessful, the first validity information specifies that the request is invalid. In particular, in order for the request to be valid, the current state of the system has to correspond to the state, given which the proposed action is considered to be appropriate. For instance, if the state of the system described in the first data item is not the current state of the system, the evaluation performed by the evaluation node is moot and the request is invalid.

The validity information allows for storing in a verifiable, immutable way the result of the evaluation without disseminating sensitive information about the state of the system and the proposed action.

According to an embodiment of the first aspect of the present invention, the proposed action comprises a financial transaction and the method comprises the step of:

Accessing a seventh data item which comprises information about an issuance of a virtual credit card (VCC).

The virtual credit card grants a credit amount to a card holder under at least a usage condition, wherein the usage condition limits the use of the virtual credit card to the financial transaction. In particular, the card holder may be the requester. The seventh data item further comprises information about the holder identity, the credit amount, and the usage condition. The method may comprise the step of:

Updating the DLD by adding an eighth data item to the DLD.

In particular, the evaluation node updates the local copy of the DLD. The eighth data item comprises information about the issuance of the virtual credit card, the holder identity, the credit amount, and the usage condition. In particular, the information about the issuance of the virtual credit card, about the holder identity, about the credit amount, and/or about the usage condition comprised in the seventh and/or in the eighth data item may be encrypted.

For example, the seventh data item may be provided by a VCC requesting device or by a VCC evaluation node of the computer network. In particular, the VCC requesting device is responsible for submitting a VCC issuance request to the VCC evaluation node, which is in charge to evaluate said request.

The information about the issuance of the VCC may specify the issuance status of the VCC. For instance, if the issuance of the VCC is allowable, said information specifies that the issuance has been approved. In particular, if the issuance of the VCC is not allowable, the information about the issuance of the VCC specifies that the issuance has been denied.

In this embodiment, the information about the VCC-request is stored in an immutable, verifiable way in the DLD. Said information may comprise the information about the issuance of the VCC as well as encrypted information about the holder identity, the credit amount, and/or about the usage condition which may be controllably disseminated by the requester and/or the evaluation authority. The information about the VCC is also trustworthy, since e.g. it may be checked by a central authority authorized by the requester to access the first and the second data item.

The financial transaction may involve an amount of money and may have to be carried out by a buyer which, in particular, can be the requester. Moreover, the method may further comprise the steps of:

accessing a ninth data item, which identifies the buyer and the amount of money, and authenticating the seventh data item against the second data item and the ninth data item, to establish whether the information of the seventh data item is compatible with the information of the second data item and of the ninth data item.

In particular, the authentication of the seventh data item is considered successful if the information of the seventh data item is compatible with the information of the second and ninth data item, and unsuccessful otherwise. For instance, the step of authenticating the seventh data item may comprise the step of establishing whether the identity of the buyer corresponds to the identity of the card holder, whether the amount of money is lower than or equal to the credit amount, and/or whether the usage condition limits the use of the VCC to the financial transaction.

The eighth data item may comprise second validity information about the result of the step of authenticating the seventh data item. For example, if the identity of the buyer and the holder correspond, the credit amount is sufficient for performing the financial transaction, and the usage condition limits the use of the VCC to said transaction, the authentication of the seventh data item is considered successful and the second validity information specifies that the VCC issuance is valid In particular, if the authentication of the seventh data item is considered unsuccessful, the second validity information specifies that the VCC issuance is invalid.

In this embodiment, the information comprised in the eighth data item is validated by the evaluation node against sensitive data stored in the ninth data item and accessible by said node.

For instance, the distributed ledger database may be a blockchain. In particular, the blockchain may be a distributed ledger database in which data are grouped into data batches (referred to as: "blocks") sequentially linked by using cryptography, thereby forming a "chain" of blocks. Said blocks may comprise a timestamp and a set of data items that are typically organized as a Merkle tree. In particular, the timestamps in the blocks allow for temporally ordering the blocks according to their creation time. Each block comprises a cryptographic hash of another block, the latter block being in particular created before the former one. The use of cryptographic hashes to link the blocks of the blockchain renders the blockchain resistant to modification of the data stored therein, which are thus stored in a transparent, non-repudiatable, and/or non-tamperable way. In order to be added to the blockchain, a new block may be required to provide a proof of work or a proof of stake.

In particular, If the DLD is a blockchain, the step of updating the DLD is performed by hashing the sixth data item and by encoding said data item in a Merkle tree comprised in a block, said block being then added to the blockchain.

In an embodiment of the first aspect of the present invention, the encrypted first information is an encryption of the first information according to a first encryption procedure. Moreover, the step of authenticating the first data item may comprise the steps of:

generating a third encrypted data item by encrypting the first data item according to the first encryption procedure; and comparing the first and the third encrypted data item.

For example, the aforementioned steps are comprised in the first authentication procedure. In this case, in particular, in order for the authentication of the first data item to be considered successful, the first and the third encrypted data item shall be identical. For instance, the first encrypted data item is a first hash of the information about the current state of the system, the first hash being obtained by means of a first cryptographic hash function, and the first encryption procedure is performed by means of the first cryptographic hash function. If this is the case, the first authentication procedure may comprise the step of generating a second hash of the first data item by means of the first cryptographic hash function, and the step of comparing the first and the second hash. In particular, in this case, in order for the authentication to be considered successful, these two hashes shall be identical.

In this embodiment, the step of authenticating the first data item allows for verifying that the information in the first data item, which is provided by the requester and is not stored in the DLD, corresponds to the information stored in encrypted form in the DLD.

The method according to first aspect of the present invention may further comprise the step of:
 accessing a tenth data item, which comprises information for performing the first encryption procedure and/or the second encryption procedure.

According to an embodiment of the first aspect of the invention, the method comprises the step of:
 accessing an eleventh data item which identifies a requester.

Moreover, according to said embodiment, the step of evaluating the request is performed by using the eleventh first data item to establish whether, given the state of the system, the requester is allowed to take the proposed action.

In this case, for instance, in order for the request to be considered acceptable, the evaluation node shall establish that the requester is allowed to take the proposed action. In particular, if the evaluation node establishes that the requester is not allowed to take the proposed action, the request is considered unacceptable.

The evaluation procedure may comprise the step of accessing the eleventh data item to acquire identification data of the requester and the step of accessing a first identification database to establish whether the identification data of the requester is stored in said database. If this is the case, the evaluation node establishes that the requester is allowed to take the proposed action. If this is not the case, the evaluation node establishes that the requester is not allowed to take the proposed action. In particular, the first identification database stores identification data of the individuals, devices, and/or organizations allowed to take the proposed action.

The fifth, ninth, tenth and/or the eleventh data item may be stored in storage means accessible by and/or comprised in the requesting device and may be protected, e.g. password-protected, to prevent unauthorized accesses by unauthorized computing devices. In order to identify the requester, the eleventh data item may comprise information about the identity of the requester and/or of the requesting device, such as a digital signature of the requester and/or of the requesting device. The eleventh data item may comprise the request which may, in particular, comprise information about the identity of the requester and/or of the requesting device.

According to the present invention, digital signatures of the requester, of the evaluation node and/or of the requesting device may be generated by using public key cryptography algorithms such as a hash algorithm and/or the Digital Signature Algorithm (DSA).

In a further embodiment of the first aspect of the present invention, the step of authenticating the first data item comprises the step of comparing the first encrypted data item with the encrypted first information. Said step may be comprised in the first authentication procedure. For example, in this case, in order for the authentication of the first data item to be considered successful, the encrypted information in the first encrypted data item and the encrypted first information shall be identical. In particular, according to this embodiment, the step of authenticating the first data item allows for verifying that the information about the state of the system used to evaluate the request is in accordance with the current state of the system, that is stored in encrypted form and in a verifiable, immutable way in the DLD.

An embodiment of the method according to the first aspect of the present invention comprises the step of:
 initiating the providing of the first data item to a validation node of the computer network for authenticating the first data item against the first encrypted data item.

In particular, the validation node may access the first data item prior authorization of the patient. The validation node may be a node authorized to access the information encoded in the first data item and, in particular, may be owned by the central authority or by the evaluation organization. For example, the validation node may be a computing device of the insurance company that has to establish whether the patient is, given the diagnosis, entitled to be funded for the purchase of the drug and/or of the medical treatment specified in the prescription.

According to the present invention, the requesting device may initiate the providing of the fourth data item to the validation node and, more particularly, to each node of the computer network. The validation node may thus perform the step of accessing the fourth and the first data item and perform the step of authenticating the first data item against the first encrypted data item e.g. according to the first authentication procedure.

In particular, the information for accessing the encrypted information in the first encrypted data item may comprise information for locating and/or accessing said encrypted information in a second database, which stores the encrypted information of the first encrypted data item. For example, the second database may acquire said encrypted information by accessing, copying, and/or receiving the first encrypted data item stored in the DLD and by storing the encrypted information comprised in said data item. The second database may be stored in the storage means of the validation node and/or may be accessible by said node.

In this embodiment, the authentication of the first data item is independently performed by two nodes of the computer network and is thus strengthened. In particular, the evaluation node may act as a disinterested central authority verifying the truthfulness of the information on the state of the system.

According to an embodiment of the first aspect of the present invention, a second encrypted data item is stored in the distributed ledger database and the fourth data item comprises information for accessing encrypted information comprised in the second encrypted data item. Moreover, the method may comprise the step of:
 authenticating the second data item against the second encrypted data item to establish whether the information in the second data item is compatible with the encrypted information comprised in the second encrypted data item.

The second data item may comprise information about the status of the proposed action. Said information may specify whether the proposed action has been already evaluated and, in the affirmative case, whether the proposed action is deemed appropriate. The information about the status of the proposed action may also specify whether the proposed action has been already carried out or is to be carried out.

In particular, the second encrypted data item comprises encrypted information about the current status of the proposed action and is stored in the DLD which is accessible by the nodes of the computer network. In particular, the encrypted information comprised in the second encrypted data item is stored in a verifiable and immutable way and is not intelligibly accessible by the nodes, that are not authorized by the requester and/or the requesting device.

The information for accessing the encrypted information in the second encrypted data item may comprise information for locating and/or accessing said encrypted information in the first database, which stores the encrypted information of the second encrypted data item. For example, the first database may acquire said encrypted information by accessing, copying, and/or receiving the second encrypted data item stored in the DLD, e.g. in the local copy thereof, and by storing the encrypted information comprised in the second encrypted data item.

The second data item is not stored in the DLD. Therefore, said data item cannot, a priori, be assumed to reflect the actual status of the proposed action, since the information comprised therein could be outdated or could have been forged or tampered. According to the present invention, the truthfulness of the information comprised in the second data item may be ascertained by authenticating said data item against the second encrypted data item, which is stored in a immutable, verifiable way in the DLD.

In particular, according to the present invention, the step of authenticating the second data item against the second encrypted data item allows the evaluation node to establish whether the current status of the proposed action stored in the second encrypted data item corresponds to the status of the proposed action comprised in the second data item. For example, in order for the authentication of the second data item to be considered successful, these two statuses shall correspond to one another. In particular, if these two statuses do not correspond, the authentication of the second data item is unsuccessful. For instance, in this case, in order for request to be valid, the authentication of the second data item has to be successful. In particular, if the authentication of the second data item is not successful, the request is considered invalid.

In this embodiment, the information about the proposed action is trustworthy and may be controllably disseminated. In particular, information about the current status of the proposed action is stored in encrypted form in the DLD and is accessible to the nodes of the computer network. Information about the status of the proposed action is also provided in unencrypted form to the evaluation node which intelligibly accesses the unencrypted information and thus performs an informed evaluation of the request. The second encrypted data item is stored in a verifiable, immutable way in the DLD and, hence, the step of authenticating the second information against the second encrypted data item allows the evaluation node and/or any other authorized computer device to establish the truthfulness of the information about the status of the proposed action. In this embodiment, the validation of the evaluation of the request is strengthen by the step of authenticating the second data item.

In particular, the encrypted second information may be an encryption of the second information according to a second encryption procedure. Moreover, the step of authenticating the second data item may comprise the steps of:
generating a fourth encrypted data item by encrypting the second data item according to the second encryption procedure; and
comparing the second and the fourth encrypted data item.

In this case, in particular, in order for the authentication of the second data item to be considered successful, the second and the fourth encrypted data item shall be identical. For instance, the second encrypted data item is a third hash of the information about the current status of the proposed action, the third hash being obtained by means of a second cryptographic hash function. If this is the case, the step of authenticating the second data item may comprise the step of generating a fourth hash of the second data item by means of the second cryptographic hash function, and the step of comparing the third and the fourth hash. In particular, in order for the authentication to be considered successful, these two hashes shall be identical. The step of authenticating the second data item allows for verifying that the information in said data item, which is provided by the requester and stored in a non-verifiable way, corresponds to the information stored in encrypted form in the DLD.

In another embodiment of the method according to the first aspect of the invention, the step of authenticating the second data item comprises the step of comparing the second encrypted data item with the encrypted second information. In this case, for instance, in order for the authentication of the second data item to be considered successful, the second encrypted data item and the encrypted second information shall be identical. In this embodiment, the step of authenticating the second data item allows for verifying that the information about the status of the proposed action used to evaluate the request is in accordance with the current status of the proposed action stored in the DLD in a verifiable, immutable way.

According to an embodiment of the present invention, the sixth data item may further comprise information for accessing the encrypted information comprised in the second encrypted data item.

The method of the first aspect of the invention may comprise the step of initiating the providing of the second data item to the validation node for authenticating the second data item against the second encrypted data item.

Another embodiment of the method according to first aspect comprises the step of:
updating the first database by adding a twelfth data item to the first database;
and/or the step of:
updating the first database by including and/or modifying information about a status of the proposed action.

The twelfth data item comprises information about the evaluation of the request performed by the evaluation node, the encrypted first information, and the encrypted second information. The information about the evaluation of the request and/or the information about the status of the proposed action may be encrypted. For example, the twelfth data item is created by the evaluation node by accessing and/or copying the information comprised in the sixth data item stored in the DLD. The twelfth data item may further comprise information for identifying the evaluation node.

If, before the step of updating the first database, said database comprises information about the status of the proposed action, the step of updating the first database may be performed by modifying said information. For example, the step of updating the first database may be performed by adding encrypted information about the status of the proposed action if, before the step of updating the first database, said database does not comprise such information.

Typically, the first database stores information about the current state of the system, and/or about the status of the proposed action and may be updated whenever said state and/or status change. In particular, the current status of the proposed action may be modified if the evaluation node considers the request to be valid. Thus, according to an embodiment of the first aspect, in order for the steps of updating the first database to be performed, the first validity information shall specify that the request is valid.

In this embodiment, the information about the request may be retrieved effectively, without having to access the DLD which, typically, stores a sizeable amount of data.

A second aspect of the present invention refers to a computer implemented method for submitting with a requesting device a request to an evaluation node of a computer network. The evaluation node is configured to evaluate the request based on a first data item comprising first information about a state of a system and on a second data item comprising second information about a proposed action in response to the state of the system.

A first encrypted data item is stored in a distributed ledger database managed by the computer network, and the method comprises at least the following steps:

Initiating the providing of the first data item, of the second data item and of the request to the evaluation node;
accessing a third data item; and
Initiating the providing of a fourth data item to the evaluation node.

The third data item comprises encrypted first information, encrypted second information, and information about the evaluation of the request performed by the evaluation node. The fourth data item comprises information for accessing encrypted information comprised in the first encrypted data item.

According to the present invention, the evaluation node may initiate the providing of the third data item and/or the requesting device may generate the fourth data item. Moreover, the requesting device may initiate the providing of the fourth data item to the validation node and, more particularly, to other nodes of the computer network. For example, the step of initiating the providing of the fourth data item may be performed by sending the fourth data item to a dispatch node of the computer network. The dispatch node may then send said data item to the evaluation node, to the validation node, and/or to other nodes of the computer network.

A method according to an embodiment of the second aspect of the present invention may also comprise the step of:

initiating the providing of a fifth data item to the evaluation node.

The fifth data item comprises information about the evaluation of the request performed by the evaluation node, the encrypted first information and the encrypted second information. In particular, the information about the evaluation of the request may be encrypted. The requesting device may initiate the providing of the fifth data item to the validation node and, more particularly, to other nodes of the computer network. For example, the step of initiating the providing of the fifth data item may be performed by sending the fifth data item to the dispatch node which then may send said data item to the evaluation node, to the validation node, and/or to other nodes of the computer network.

According to a further embodiment of the second aspect of the invention, the proposed action comprises a financial transaction and the method comprises the step of:

receiving a virtual credit card.

The virtual credit card grants a credit amount to a card holder under a usage condition, the usage condition limiting the use of the virtual credit card to the financial transaction. In particular, the card holder may be the requester submitting the request to the evaluation node. For example, the virtual credit card may be used by the requester to carry out the financial transaction comprised in the proposed action.

The method according to the second aspect of the invention may comprise the step of initiating the providing of the fourth data item to a validation node of the computer network.

In an embodiment of the second aspect of the invention, the encrypted first information is an encryption of the first information according to a first encryption procedure and/or the encrypted second information is an encryption of the second information according to a second encryption procedure. Moreover, the method may further comprise the step of initiating the providing of a tenth data item to the evaluation node. The tenth data item comprises information for performing the first encryption procedure and/or the second encryption procedure.

An embodiment of the method according to the second aspect of the invention comprises the step of initiating the providing of an eleventh data item to the evaluation node, wherein the eleventh data item comprises information identifying a requester.

In an embodiment of the second aspect of the invention, a second encrypted data item is stored in the distributed ledger database and the fourth data item comprises information for accessing encrypted information comprised in the second encrypted data item.

The method according to the second aspect of the invention and the embodiments thereof allow the requesting device to initiate the method according to the first aspect of the invention. Moreover, the method of the second aspect and the embodiments thereof allow for exchanging data with the nodes of the computer network in such a way that the information about the state of the system, the proposed action, and/or the evaluation of the request are trustworthy and may be controllably disseminated by the requesting device.

A third aspect of the present invention refers to a computer implemented method for submitting and evaluating a request, wherein the request is submitted by a requesting device to an evaluation node of a computer network. The evaluation node is configured to evaluate the request based on a first data item comprising first information about a state of a system and on a second data item comprising second information about a proposed action in response to the state of the system.

A first encrypted data item is stored in a distributed ledger database managed by the computer network. The method according to the third aspect comprises the steps of the method according to the first aspect and/or of the embodiments thereof. Moreover, the method according to the third aspect comprises the steps of the method according to the second aspect and/or of the embodiments thereof.

In particular, the steps of the method according to the first aspect of the invention are performed by the evaluation node and/or the steps of the method according to the second aspect of the invention are performed by the requesting device.

The nodes (e.g. the evaluation and the validation node), the requesting device, the request, the system, the state of the system, the proposed action, the data items (e.g. the first, second, third, fourth, fifth, tenth, eleventh data item, as well as the first and the second encrypted data item), the information (e.g. the first and second information, the encrypted first and second information, and the information about the evaluation of the request), the digital signatures (e.g. the digital signatures of the requester of the requesting device, and of the evaluation node), the DLD, the encryption procedures (e.g. the first and the second encryption procedure), the financial transaction, the virtual credit card, the credit amount, the card holder, and the usage condition of the second and of the third aspect of the present invention may comprise the features of their homonymous counterparts described when discussing the first aspect of the invention.

In one embodiment of the methods according to the present invention, the information about the evaluation of the request performed by the evaluation node may be encrypted.

In this embodiment, the information about the result of the evaluation and the information, on which the evaluation is based, is stored in encrypted form and in verifiable, immutable way in the DLD. Said information is trustworthy and may be controllably disseminated by the requesting device and/or the evaluation organization. This information may also be verified by the central authority authorized by the requester to access the first data item, the second data item, and the result of the evaluation of the request.

According to an embodiment of the methods of the invention, the fourth data item comprises information for accessing encrypted information comprised in the second encrypted data item.

Moreover, the fourth data item may comprise information identifying the evaluation node. In particular, the information identifying the evaluation node is a first digital signature of the evaluation node and/or a first digital signature of the requesting device.

In this case, the step of authenticating the first data item may comprise the step of accessing the information identifying the evaluation node to acquire the identification data of said node; and the step of accessing a second identification database to establish whether the evaluation node is allowed to evaluate the request. In particular, the second identification database stores the identification data of the nodes allowed to evaluate the request. In this case, in particular, in order for the authentication of the first data item to be successful, the evaluation node shall be allowed to evaluate the request. The step of authenticating the first data item is thus strengthen by this check on the identity of the node performing the evaluation.

In a further embodiment of the methods of the invention, the third data item comprises information identifying the evaluation node. Said information may in particular comprise a second digital signature of the evaluation node.

The request of the present invention may in particular comprise information for identifying the requesting device. Said information may comprise a second digital signature of the requesting device. Moreover, the evaluation procedure may comprise the step of accessing the information for identifying the requesting device to acquire identification data of the requester. In this case, for instance, in order for the request to be considered acceptable, the evaluation node shall establish whether the requester is allowed to take the proposed action. In particular, if the evaluation node establishes that the requester is not allowed to take the proposed action, the request is considered unacceptable. The evaluation procedure may comprise the step of accessing the information for identifying the requesting device to acquire identification data of the requester.

The present invention refers also to a data processing system comprising at least a processor configured to perform the methods according to the first, the second, and/or the third aspect of the present invention.

In particular, the evaluation node is a data processing system comprising a processor configured to perform the method according to the first aspect of the invention and/or the requesting device is a data processing system comprising a processor configured to perform the method according to the second aspect of the present invention. For example, a system comprising the evaluation node and the requesting device is a data processing system comprising a processor configured to perform the method according to the third aspect of the invention.

The present invention refers to a computer program product comprising instructions which, when the computer program product is executed by a computing device, cause the computing device to carry out the methods according to the first, the second and/or the third aspect of the present invention.

The present invention concerns also a computer readable medium comprising the computer program product of the present invention. The computer readable medium is, in particular, nontransitory.

The methods according to the present invention may comprise the step of initiating the providing of a thirteenth data item to one or more updating nodes of the computer network, said step being in particular performed by the requesting device. The thirteenth data item may comprise the information comprised in the fourth data item and, in particular, may be identical to the fourth data item.

The methods of the present invention may comprise the step of accessing the thirteenth data item and the step of authenticating the first data item against the first encrypted data item to establish whether the information in the first data item is compatible with the encrypted information in the first encrypted data item. In particular, said steps are performed by each of the updating nodes. For instance, in order for the authentication performed by said each of the updating nodes to be successful, the encrypted information in the first encrypted data item and the encrypted first information shall be identical. The thirteenth data item may comprise first validity information. In this case, for example, in order for the authentication performed by said each of the updating nodes to be successful, the first validation data shall specify that the authentication performed by the evaluation node is successful.

For instance, the thirteenth data item may comprise information about the identity of the evaluation node, e.g. a digital signature thereof. If this is the case, the authentication performed by each of the updating nodes may comprise the steps of acquiring the identification data of the evaluation node, and the step of accessing the second identification database to establish whether the evaluation node is allowed to evaluate the request. In this case, in particular, in order for the authentication performed by said each node to be successful, the evaluation node shall be allowed to evaluate the request.

The thirteenth data item may also comprise information for accessing the second encrypted data item in the DLD. If this is the case, the methods according to the present invention may comprise the step of authenticating the second data item against the second encrypted data item to establish whether the information in the second data item is compatible with the encrypted information in the second encrypted data item. Said step may be performed by each of the updating nodes.

An embodiment of the methods of the invention may comprise the steps of accessing a fifteenth data item and of updating the DLD by adding a sixteenth data item, said steps being e.g. performed by each of the updating nodes. The fifteenth and sixteenth data item may comprise the information comprised in the fifth and sixth data item, respectively. For instance, the fifteenth and sixteenth data item may be identical to the fifth and the sixth data item, respectively. In particular, each of the updating nodes updates the copy of the DLD stored in said each updating node evaluation node.

The sixteenth data item stored by each of the updating node in the DLD may comprise third validity information about the result of the step of authenticating the first data item performed by said each node. In particular, if the authentication performed by said each node is successful, the third validity information specifies that said authentication is valid. If, instead, the authentication performed by said each node is not successful, the third validity information specifies that said authentication is invalid.

In particular, each of the updating node updates a database stored in said each node by adding a seventeenth data item. The seventeenth data item may comprise the information comprised in the twelfth data item and may be identical to the twelfth data item. Alternatively or in conjunction with the above, said database may be updated by the said each node by modifying and/or including information about the status of the proposed action.

Each of the updating node of the computer network may also update the DLD by updating an eighteenth data item to the DLD. The eighteenth data item comprises the information comprised in the eighth data item and, in particular, may be identical to the eighth data item.

Through the present specification, the steps of the methods according to the present invention are disclosed in a disclosing order. Said disclosing order, however, does not necessarily reflects the chronological order in which the steps of said methods are performed.

Exemplary embodiments of the invention are described in the following with respect to the attached figures. The figures and corresponding detailed description serve merely to provide a better understanding of the invention and do not constitute a limitation whatsoever of the scope of the invention as defined in the claims. In particular:

Figure 1A:
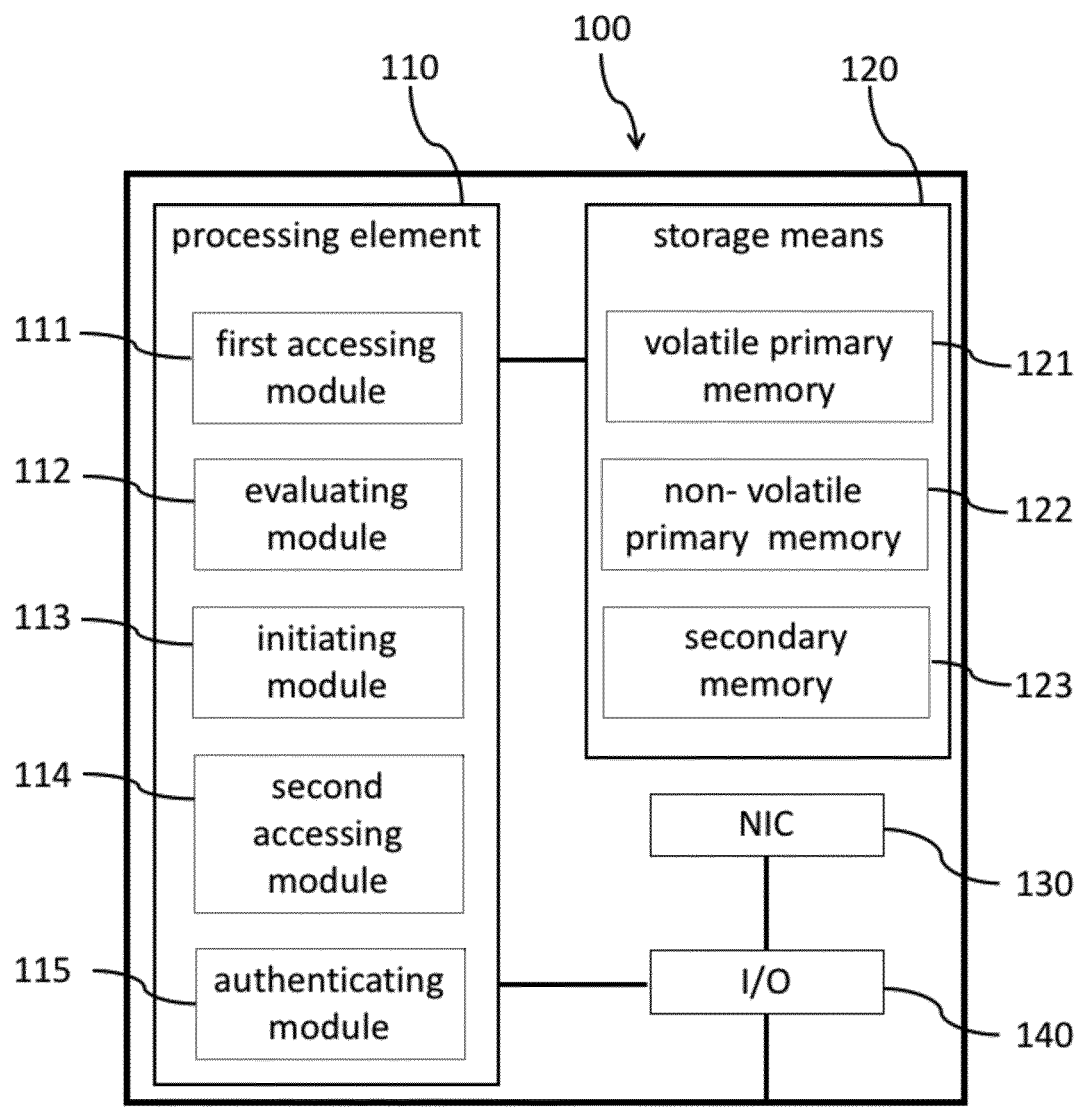
FIG. 1a is a schematic view of a first embodiment of the evaluation node.

FIG. 1a is a schematic view of a first embodiment of the evaluation node 100 which may be a computing device or a cluster thereof. The evaluation node 100 comprises a processing element 110 and storage means 120, which are in data communication with one another.

The processing element 110 may be a CPU or a GPU and comprises several modules 111-115 configured to perform the steps of the first aspect of the present invention. The first accessing module 111 is configured to access (e.g. read, receive, and/or copy) the first data item, the second data item and the request. The evaluating module 112 is configured to evaluate the request by using the first and the second data item to establish whether, given the state of the system, the proposed action is appropriate. The initiating module 113 and the second accessing module 114 are configured to initiate the providing of the third data item and to access the fourth data item, respectively. The authenticating module 115 is configured to authenticate the first data item against the first encrypted data item to establish whether the information in the first data item is compatible with the information in the first encrypted data item. In particular, the authenticating module 115 is configured to authenticate the second data item against the second encrypted data item to establish whether the information in the second data item is compatible with the information in the second encrypted data item The storage means 120 may comprise volatile primary memory 121 and/or non-volatile primary memory 121. The storage means 120 may further comprise a secondary memory 123, which may store the operating system of the evaluation node 100 and a copy of the DLD and/or of the first database. Moreover, the secondary memory 123 may store a computer program product comprising instructions which, when the computer program product is executed by the processing element 110, cause the evaluation node 100 to carry out the method according to the first aspect of the invention. The secondary memory 123, the primary memories 121, 122, and the processing element 110 need not be physically housed within the same housing and may instead be spatially separated from one another. In particular, the secondary memory 123, the primary memories 121, 122, and the processing element 110 may be spatially separated from one another and may exchange data with one another via wired and/or wireless media (not shown).

The evaluation node 100 further comprises a network interface controller (NIC) 130 configured to connect the evaluator node 100 with a suitable network (not shown). According to the present invention, a suitable network may for instance be an intranet, the internet or a cellular network. For instance, the NIC allows the evaluation node 100 to exchange data with the requesting device and/or with the other nodes, e.g. the validation node, of the computer network. The evaluation node 100 may further comprise an input/output (I/O) interface 140 which allows the evaluation node 100 to communicate with input/output devices, e.g. displays, keyboards, touchscreens, printers, mice, or the like.

Figure 1B:
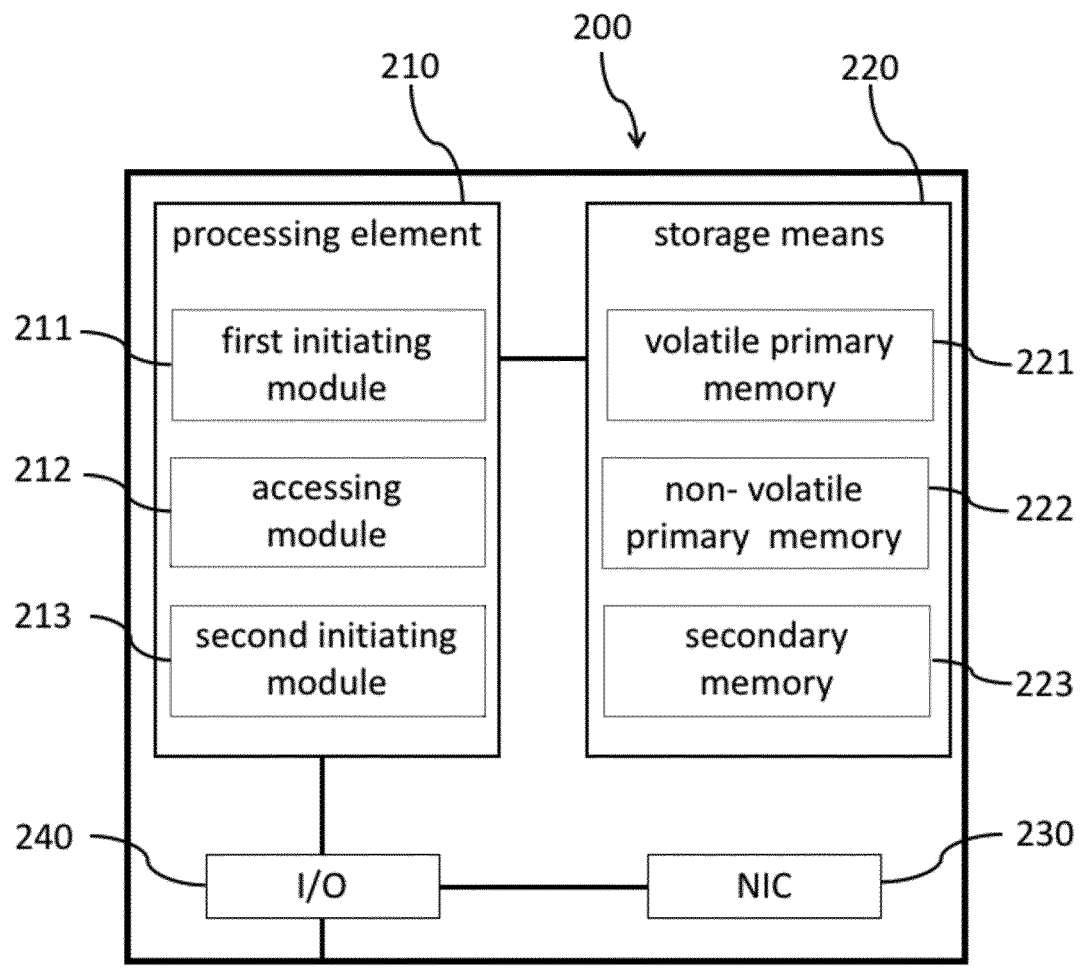
FIG. 1b is a schematic view of a first embodiment of the requesting device.

FIG. 1b is a schematic view of a first embodiment of the requesting device 200 which may be a computing device or a cluster thereof. The requesting device 200 comprises a processing element 210 and storage means 220 in data communication with one another.

The processing element 210 may be a CPU or a GPU and comprises several modules 211-213 configured to perform the steps of the second aspect of the present invention. In particular, the first initiating module 211 is configured to initiate the providing of the first data item, of the second data item, and of the request to the evaluation node. The accessing module 212 and the second initiating module 213 are configured to access the third data item and to initiate the providing of the fourth data item to the evaluation node, respectively.

The storage means 220 may comprise volatile primary memory 221 and/or non-volatile primary memory 222. The storage means 221 may further comprise a secondary memory 223, which stores the operating system of the requesting device 200 and may also store the first, the second, the fifth, the ninth, the tenth, and/or the eleventh data item. The secondary memory 223 may also store a computer program product comprising instructions which, when the computer program product is executed by the requesting device 200, cause said device 200 to carry out the method according to the second aspect of the invention. The secondary memory 223, the primary memories 221, 222, and the processing element 210 need not be physically housed within the same housing and may instead be spatially separated from one another. In particular, the secondary memory 223, the primary memories 221, 222, and the processing element 210 may be spatially separated from one another and may exchange data with one another via wired and/or wireless media (not shown).

The requesting device 200 further comprises a network interface controller (NIC) 230 configured to connect the requesting device 200 with the suitable network (not shown). For instance, the NIC 230 allows the requesting device 200 to exchange data items with the evaluation node and/or with other nodes of the computer network (not shown). The requesting device 200 further comprises an input/output (I/O) interface 240 which allows the evaluation node 100 to communicate with input/output devices (e.g. displays, keyboards, touchscreens, printers, mice, or the like). In particular, the I/O interface 240 allows the requester to instruct the requesting device to initiate the method of the second aspect of the invention and/or to control the status of the request, the status of the issuance of the VCC, and/or the status of the proposed action.

Figure 2:
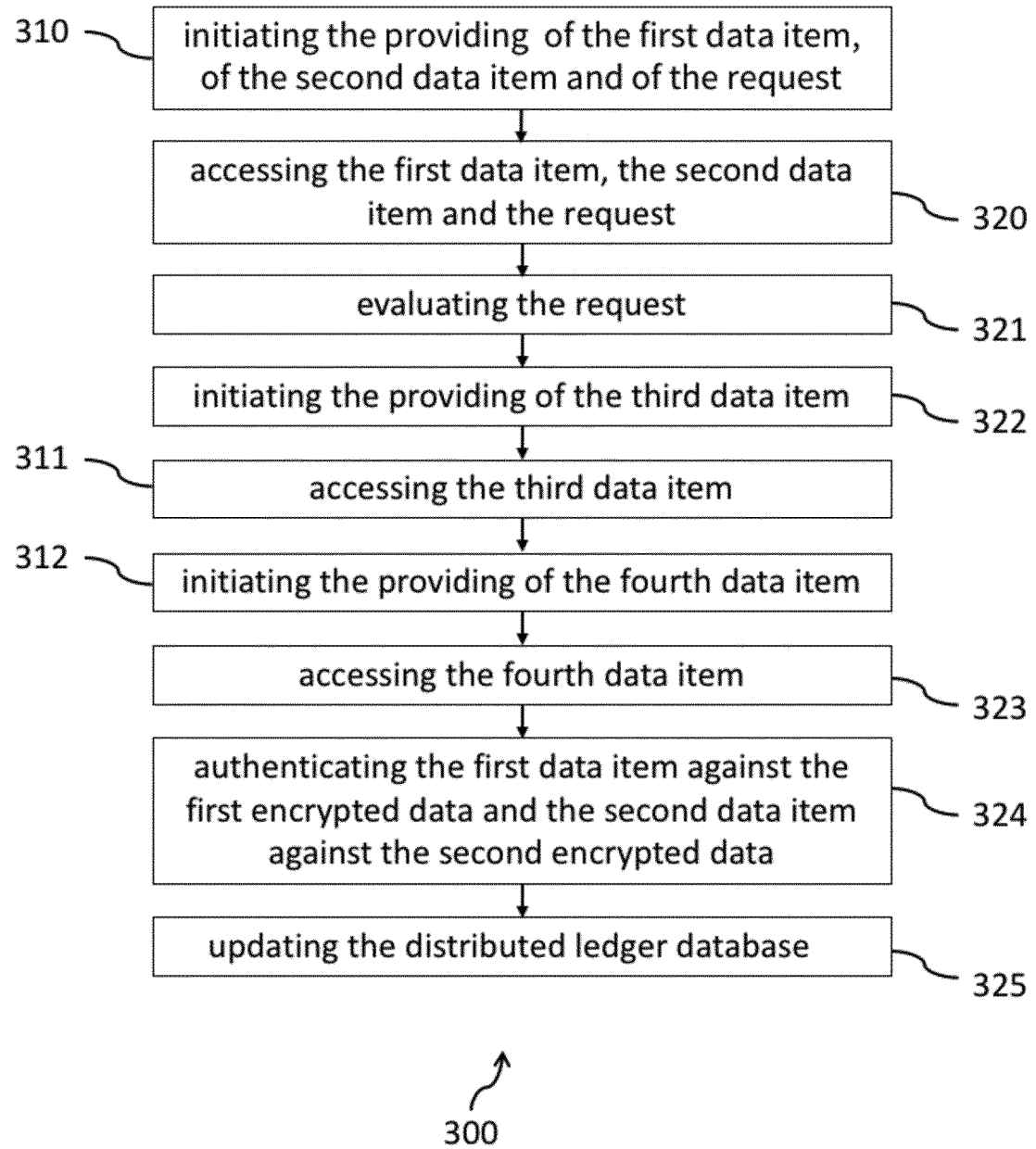
FIG. 2 is a flow diagram of the operation of a first embodiment of the method according to the third aspect of the present invention.

FIG. 2 is a flow diagram 300 of the operation of a first embodiment of the method according to the third aspect of the present invention. The flow diagram comprises the steps 320-325 of a first embodiment of the method according to the first aspect of the invention and the steps 310-313 of a first embodiment of the method according to the second aspect of the invention.

At step 310, the requesting device 200 initiates the providing of the first data item, of the second data item, and of the request to the evaluation node. In particular, said data items and the request are sent to the evaluation node 100 via the NCI 230 of the requesting device 200 and are received by the evaluation node 100 via its NCI 130.

In a first variant of the embodiment, the system and the state thereof may be a machine tool (e.g. a milling or a grinding machine) and the internal status of said machine tool, respectively. The first data item may comprise information about possible malfunctioning of the machine tool and the proposed action may be an action aiming to overcome said malfunctioning. The requesting device 200 may be a computing device integrated in the machine tool and the evaluation node 100 may be a computing device of the maintenance department of a factory.

In a second variant, the system may be a first computing device and the state of the system the internal status, e.g. the security status, of said device. For instance, the first data item may comprise information about the presence of a potentially infected file stored in the first computing device and the proposed action may be an action aiming to quarantine or erase said file. In this case, the requesting device 200 may be the first computing device and the evaluation node may be a second computing device owned by a software security company.

In a third variant, the system and the state thereof may be a patient and a diagnosis made by a physician, respectively. The proposed action may thus be the action of purchasing a drug and/or medical treatment prescribed by a physician by paying with health insurance. In particular, the evaluation node 200 may be a computer device of an insurance company and the requesting device 100 may be a computing device of the patient. In this case, the patient submits a request asking the insurance company to cover the costs of the aforementioned drug and/or medical treatment.

In the third variant of this embodiment, the first and the second data item respectively comprise information about the diagnosis and the prescription performed by the physician. The second data item further comprises information about the status of the prescription, said information specifying, in particular, whether the prescription has been already used to purchase the prescribed drug and/or medical treatment. Moreover, the first and the second data item are part of the electronic health record (EHR) of the patient. Typically, the EHR comprises sensitive information and thus may be accessible only by the patient and by individuals, institutions, and/or organisations authorised by the patient. For example, the EHR may be password protected.

At step 320, the evaluation node 100 accesses the first data item, the second data item, and the request to acquire the first and the second information. The evaluation node 100 also acquires the identity of the requester, wherein said identity may be comprised in the request or in the eleventh data item and may be in the form of a digital signature of the requester or of the requesting device.

At step 321, the evaluation node 100 evaluates the request. In particular, the evaluation node 100 establishes whether, given the state of the system and the identity of the requester, the proposed action is appropriate and the requester is allowed to take this action. In order for the request to be acceptable, the requester has to be allowed to take the proposed action and said action has to be considered appropriate.

For example, in the third variant of this embodiment, the evaluation node 100 considers the request to be allowable if, in particular, the following conditions are fulfilled:

the diagnosis and the prescription are issued by a physician for the patient;
the patient has a policy stipulated with the insurance company;
given the diagnosis made by the physician, the patient's policy covers the purchase of the prescribed drug and/or medical treatment; and
the status of the proposed action specifies that the prescription has not been already used to purchase the prescribed drug and/or medical treatment.

The evaluation node 100 may then generate the third data item, which comprises the encrypted first information, the encrypted second information, the information about the evaluation of the request performed by the evaluation node 100, and the second digital signature of the evaluation node. In the third variant, the information about the evaluation of the request is encrypted.

At step 322, the evaluation node 100 initiates the providing of the third data item which, for instance, may be sent to the requesting device 200 via the NIC 130.

At step 311, the requesting device 200 accesses the third data item. If the request is acceptable, the requesting device 200 generates the fourth data item and, at step 312, initiates the providing of said data item. The fourth data item comprises information for accessing the encrypted information comprised in the first and in the second encrypted data item. In particular, the fourth data item comprises the fifth data item encoding information about the evaluation of the request performed by the evaluation node, the encrypted first information, and the encrypted second information. The fourth data item may comprise information identifying the evaluation node and/or may be identical to the third data item.

The requesting device 200 may also initiate the provision of the fourth data item to the evaluation node (not shown) and/or other nodes of the computer network. For instance, the requesting device 200 may initiate the provision of the fourth data item to the updating nodes which, as discussed above, update their copy of the DLD.

The information comprised in the fourth data item is to be shared across the nodes of the computer network to allow them to update the DLD. Therefore, depending on the nature of the proposed action and the state of the system, the information about the evaluation of the request may be encrypted. In the third variant of this embodiment, said information may reveal the identity and/or the health status of the patient and thus is preferably encrypted.

At step 323, the evaluation node 100 accesses the fourth data item. At step 324, said node authenticates the first data item against the first encrypted data item and the second data item against the second encrypted data item to establish whether the information in the first and second data item is compatible with the information in the first and second encrypted data item, respectively. In particular, step 324 may be performed at least in part according to the first authentication procedure.

For example, in the third variant of this embodiment, the first and the second encrypted data item stored in the DLD comprise information about the current health status of the patient and about the current status of the proposed action, respectively. The encrypted information about the current status of the proposed action may specify whether the prescription has been already used by the patient to purchase the prescribed drug and/or medical treatment. In this case, the evaluation of the request is considered valid if the diagnosis does still reflect the health status of the patient, e.g. if it has not been superseded by a more recent diagnosis, and if the prescription has not been already used to purchase the prescribed drug and/or medical treatment.

At step 325, the evaluation node 100 updates the DLD by adding the sixth data item to said database. The sixth data item comprises information about the evaluation of the request performed by the evaluation node, the encrypted first information, the encrypted second information, and first validity information. In the third variant of this embodiment, the information about the evaluation of the request may be encrypted.

If the authentication of the first and of the second data item is considered successful, the first validity information specifies that the request is valid. If, instead, the authentication of said data items is considered unsuccessful, the first validity information specifies that the request is invalid. In particular, if the request is valid, the evaluation node 100 updates the first database by adding the twelfth data item, which comprises information about the evaluation of the request performed by the evaluation node, the encrypted first information, and the encrypted second information.

In particular, the step of generating the fourth data item as well as steps 312, 323, 324 and 325 are performed only if the request is considered acceptable.

Figure 3:
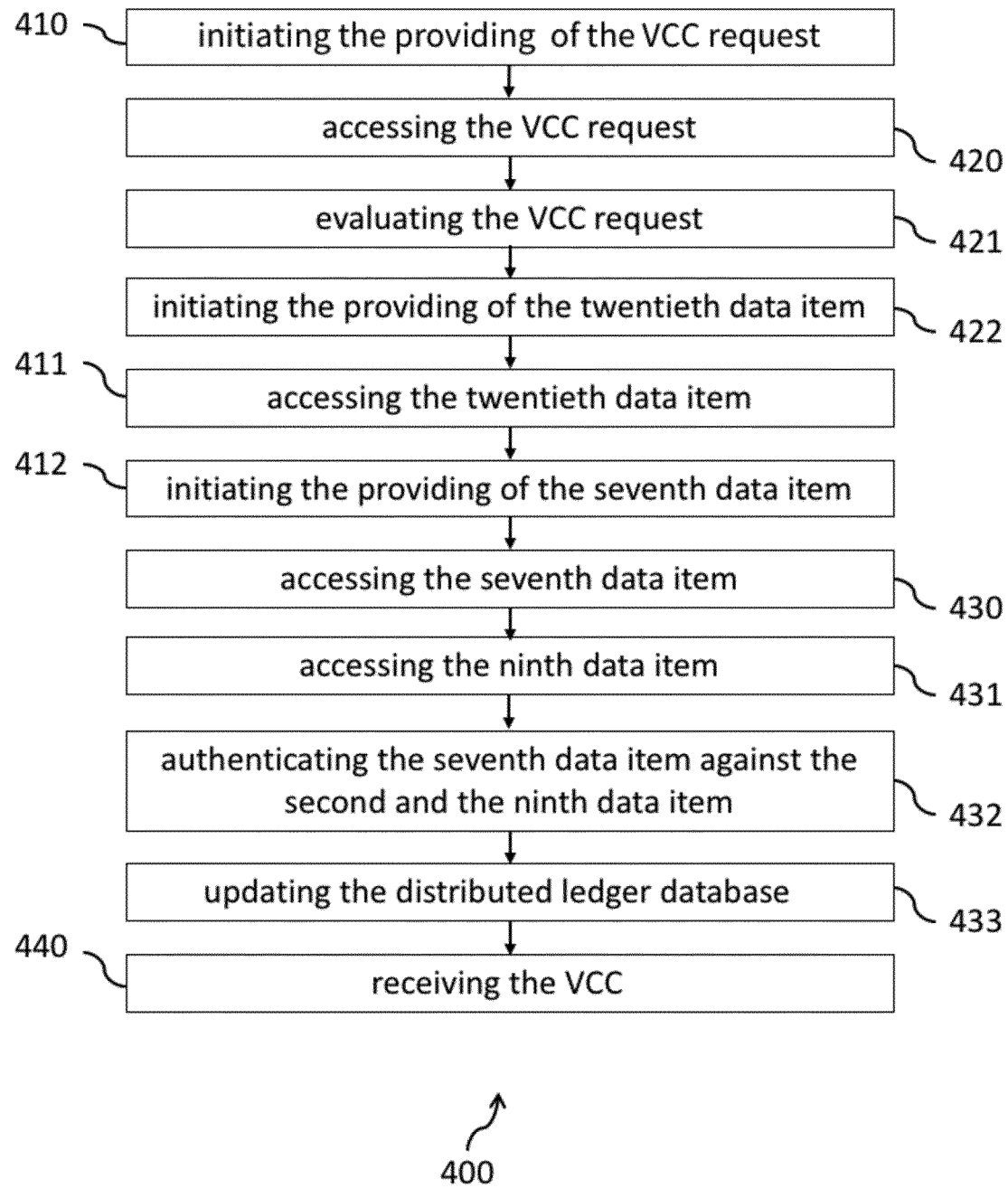
FIG. 3 is a flow diagram depicting some of the steps of a second embodiment of the method according to the third aspect of the present invention.

FIG. 3 is a flow diagram 400 depicting some of the steps of a second embodiment of the method according to the third aspect of the present invention. This embodiment is an embodiment of the third variant described above and depicted in FIG. 2, and may comprise the steps and the features thereof. The second embodiment of the third aspect of the invention comprises steps 320 to 325 and 430 to 433 of a second embodiment of the method according to the first aspect, and steps 310 to 313 and 440 of a second embodiment of the method according to the second aspect.

In the second embodiment of the third aspect of the invention, the financial transaction is the purchase of the drug or of the medical treatment, the buyer is the patient, and the amount of money needed to carry out the financial transaction may be the recommended retail price of the drug and/or medical treatment. According to this embodiment, if the request submitted by the patient is considered acceptable and valid, the insurance company submits a VCC-request with a VCC requesting device. In particular, the requesting device may be the evaluation node 100. The evaluation of the VCC-request is performed by the VCC evaluation node which may be owned by a company issuing virtual credit cards.

At step 410, the VCC requesting device initiates the providing of the VCC-request which comprises information identifying the insurance company and the amount of credit requested. The credit requested should in particular be equal to or greater than the amount of money needed to perform the financial transaction.

At step 420, the VCC evaluation node accesses the VCC-request and acquires the information identifying the insurance company. At step 421, the VCC evaluation node uses said information to evaluate the VCC-request by establishing whether the issuance of the VCC is allowable e.g. whether the insurance company is eligible for obtaining the amount of credit requested.

The VCC evaluation node accesses a nineteenth data item comprising information about the holder identity and the usage condition. In this case, the usage condition is the requirement that the virtual credit card has to be used only to purchase the prescribed drug and/or medical treatment. The nineteenth data item may be or may be comprised in the ninth data item and/or comprise the VCC-request, and may be stored in a database of the insurance company or in the secondary memory 223 of the requesting device 200. Typically, the nineteenth data item contains sensitive information and thus can only be accessed by the VCC evaluation node prior authorization of the patient. The step of accessing the nineteenth data item may be performed before or during step 410, between steps 410 and 420, or during or after step 420.

The VCC evaluation node may then generate a twentieth data item, which comprises information about the issuance of the VCC and a digital signature of the VCC evaluation node. The twentieth data item further comprises the information about the holder identity, the credit amount, and the usage condition encoded in the nineteenth data item. The information about the issuance of the VCC specifies whether the issuance of the VCC is allowable. The information about the holder identity, the credit amount, and/or the usage condition comprised in the twentieth data item may be encrypted.

At step 422, the VCC evaluation node initiates the providing of the twentieth data item to the VCC requesting device which accesses the twentieth data item (step 411) generates the seventh item and, at step 412, initiates the providing of the seventh item to the evaluation node 100. In particular, the seventh data item comprises information about the issuance of the VCC and encrypted information about the holder identity, the credit amount, and the usage condition. The VCC requesting device may also initiate the provision of the seventh item to the updating nodes, which update their copy of the DLD.

At step 430, the evaluation node 100 acesses the seventh data item and, at step 431, accesses the ninth data item, which identifies the buyer and the amount of money and may be stored in an internal database of the insurance company. Said data item may have been created after the step 325 of updating the DLD, shown in FIG. 2, provided that the request submitted by the patient to the evaluation node has been considered allowable and valid.

At step 432, the evaluation node 100 authenticates the seventh data item against the second and the ninth data item to establish whether the information of the seventh data item is compatible with the information of the second and of the ninth data item. In particular, at step 432, the evaluation node 100 establishes whether the identity of the patient corresponds to the identity of the card holder, whether the amount of money needed to purchase the drug and/or the treatment is lower than or equal to the credit amount, and whether the usage condition limits the use of the VCC to the purchase of said drug and/or medical treatment.

At step 433, the evaluation node 100 updates the DLD by adding the eighth data item thereto. The eighth data item comprises the information of the seventh data item and second validity information about the result of the step of authenticating the seventh data item. If the authentication of the seventh data item is considered successful, the second validity information specifies that the VCC issuance is valid and, if said authentication is considered unsuccessful, the second validity information specifies that the VCC issuance is invalid. In particular, if the VCC issuance is valid, the evaluation node 100 may update the first database by adding the eighth data item thereto.

At step 440, the requesting device 200 receives the VCC, which may then be used by the patient to purchase the prescribed drug and/or medical treatment.

In particular, the step of generating the fourth data item and steps 312 and 323 to 325 are performed only if the request is acceptable. For instance, the step of generating the seventh data item and steps 412, 430 to 433 and 440 are performed only if the request is acceptable and the information about the issuance of the VCC specifies that the VCC issuance has been approved.

The invention claimed is:

1. A computer implemented method for performing an evaluation of a request submitted by a requesting device, the evaluation of the request being performed by an evaluation node of a computer network and being based on a first data item comprising first information about a state of a system and on a second data item comprising second information about a proposed action in response to the state of the system, wherein a first encrypted data item is stored in a distributed ledger database managed by the computer network, and the method comprising:
   accessing the first data item, the second data item and the request;
   evaluating the request at least by using the first and the second data item to establish whether, given the state of the system, the proposed action is appropriate;
   initiating the providing of a third data item which comprises encrypted first information, encrypted second information, and information about the evaluation of the request performed by the evaluation node;
   accessing a fourth data item which comprises information for accessing encrypted information comprised in the first encrypted data item; and
   authenticating the first data item against the first encrypted data item to establish whether the information in the first data item is compatible with the encrypted information comprised in the first encrypted data item.

2. The method of claim 1, further comprising:
   accessing a fifth data item which comprises information about the evaluation of the request performed by the evaluating node, the encrypted first information and the encrypted second information; and
   updating the distributed ledger database by adding a sixth data item to the distributed ledger database, the sixth data item comprising information about the evaluation of the request performed by the evaluation node, the encrypted first information, and the encrypted second information.

3. The method of claim 1, wherein the proposed action comprises a financial transaction and the method comprises:
   accessing a seventh data item which comprises information about an issuance of a virtual credit card granting a credit amount to a card holder under at least a usage condition, the usage condition limiting the use of the virtual credit card to the financial transaction, wherein the seventh data item further comprises information about the holder identity, the credit amount, and the usage condition;
   updating the distributed ledger database by adding an eighth data item to the distributed ledger database, the eighth data item comprising information about the issuance of the virtual credit card, the holder identity, the credit amount, and the usage condition.

4. The method of claim 3, wherein the financial transaction involves an amount of money and is to be carried out by a buyer, the method further comprising:
   accessing a ninth data item, which identifies the buyer and the amount of money, and
   authenticating the seventh data item against the second data item and the ninth data item, to establish whether the information of the seventh data item is compatible with the information of the second data item and of the ninth data item,
   wherein the eighth data item comprises second validity information about the result authenticating the seventh data item.

5. The method of claim 1, wherein the distributed ledger database is a blockchain.

6. The method of claim 1, wherein the encrypted first information is an encryption of the first information according to a first encryption procedure, wherein authenticating the first data item comprises:
   generating a third encrypted data item by encrypting the first data item according to the first encryption procedure; and
   comparing the first and the third encrypted data item;
   and/or wherein authenticating the first data item comprises comparing the first encrypted data item with the encrypted first information.

7. The method of claim 1, further comprising:
   initiating the providing of the first data item to a validation node of the computer network for authenticating the first data item against the first encrypted data item.

8. The method of claim 1, wherein a second encrypted data item is stored in the distributed ledger database and the fourth data item comprises information for accessing encrypted information comprised in the second encrypted data item, wherein the method comprises:
   authenticating the second data item against the second encrypted data item to establish whether the information in the second data item is compatible with the encrypted information comprised in the second encrypted data item.

9. The method of claim 8, wherein the encrypted second information is an encryption of the second information according to a second encryption procedure, wherein authenticating the second data item comprises:
generating a fourth encrypted data item by encrypting the second data item according to the second encryption procedure; and
comparing the second and the fourth encrypted data item;
and/or wherein authenticating the second data item comprises comparing the second encrypted data item with the encrypted second information.

10. A computer implemented method for submitting with a requesting device a request to an evaluation node of a computer network, the evaluation node being configured to evaluate the request based on a first data item comprising first information about a state of a system and on a second data item comprising second information about a proposed action in response to the state of the system, wherein a first encrypted data item is stored in a distributed ledger database managed by the computer network, and the method comprising:
initiating the providing of the first data item, of the second data item and of the request to the evaluation node;
accessing a third data item, the third data item comprising encrypted first information, encrypted second information, and information about the evaluation of the request performed by the evaluation node; and
initiating the providing of a fourth data item to the evaluation node, the fourth data item comprising information for accessing encrypted information comprised in the first encrypted data item.

11. The method of claim 10, further comprising:
initiating the providing of a fifth data item to the evaluation node, the fifth data item comprising information about the evaluation of the request performed by the evaluation node, the encrypted first information and the encrypted second information.

12. The method of claim 10, further comprising:
initiating the providing of the fourth data item to a validation node of the computer network.

13. The method of claim 10, wherein the information about the evaluation of the request performed by the evaluation node is encrypted.

14. The method of claim 10, wherein the third and/or the fourth data item comprises information identifying the evaluation node.

15. A data processing system comprising at least a processor configured to perform the method of claim 1.

16. A computer program product comprising instructions which, when the computer program product is executed by a computing device, cause the computing device to carry out the method according to claim 1.

* * * * *